June 8, 1965  R. OELKRUG  3,188,112
HEAD GUARD FOR PASSENGERS IN AUTOMOTIVE VEHICLES
Filed Feb. 26, 1963  2 Sheets-Sheet 1

INVENTOR.
Rolf Oelkrug
BY Mestern, Ross & Mestern

June 8, 1965 R. OELKRUG 3,188,112
HEAD GUARD FOR PASSENGERS IN AUTOMOTIVE VEHICLES
Filed Feb. 26, 1963 2 Sheets-Sheet 2

INVENTOR.
Rolf Oelkrug
BY Mestern, Ross & Mestern

United States Patent Office 3,188,112
Patented June 8, 1965

3,188,112
HEAD GUARD FOR PASSENGERS IN
AUTOMOTIVE VEHICLES
Rolf Oelkrug, Beimler Str. 17d, Augsburg, Germany
Filed Feb. 26, 1963, Ser. No. 261,059
Claims priority, application Germany, Feb. 28, 1962,
O 8,538
8 Claims. (Cl. 280—150)

The present invention concerns a head guard for passengers in automotive vehicles comprising a protective device to prevent head injuries frequently occurring in car accidents.

Frequently in a car accident the passenger can suffer a serious head injury owing to striking his head against the windshield due to sudden braking or stopping due to an impact. In most cases, especially when the passenger is able to notice the rapidly approaching obstacle and instinctively braces himself forwardly with his feet, the impact of the head, as proved from experience, takes place in the upper region of the windshield. The movement path of the head thus follows a diagonally upwardly directed curved course, the pivot of which is formed by the supported feet and the radius of which is the length of the braced body.

It is an object of the present invention to reduce head injuries caused in this manner.

According to the present invention a head guard for use in automotive vehicles comprising a resilient member or flap substantially like a sun visor arranged above the windshield, is characterised in that the member or flap is adapted to be swung downwardly to a position in front of the windshield by the release of an arresting device arranged upwardly and forwardly of the direction of movement of the head.

In a preferred embodiment the arresting device comprises a yoke, base plate, or the like resiliently pressed against a stop connected to the flap. The arresting device may be provided with a padding which is arranged at right angles to the movement course of the head of the body thrown forwards due to impact. This padding, for example, may be of foamed material such as cellular plastics, which may be reinforced by springs or the like bracing means. This causes the impact of the head to be absorbed against the release device and the pressure exerted from below to be transmitted immediately to the springs of the arresting device.

The flap also may be padded on the inner side remote from the windshield. The force of the head is substantially absorbed by the padding of the arresting device over which the head slides downwardly. By the time the impact on the windshield takes place, with the impact now taking place the protecting flap comes between the head and the windshield; it is clear that the flap may be made of a suitable material of adequate resilience and strength, so that the risk of head injuries is substantially reduced.

A spring is expediently provided to accelerate the downward pivoting movement of the flap; the tension of the spring, when the arresting device is released, immediately causes the flap to be moved into a position parallel to the windshield.

Stops or suitably arranged notches may be provided for fixing the flap in different desired positions when it is returned by hand to its inactive position, the arresting device engaging in these stops or notches.

The lower portion of the flap, extending beyond the width of the normal sun visor, may be made of transparent plastics material to avoid obscuring of the driver's vision during the initial moments before collision; so constructed flap may also be used as a sun visor.

The flap may also be released by means of a light barrier comprising a light source and a photo-electric cell and also mirrors arranged at suitable points on both sides of the automobile adjacent the windshield. Interruption of the light barrier by the headway, for example, be made to actuate a protective switch, the attracted armature of which then releases the flap for the pivoting movement. However, no claim is made to this particular feature.

To take into account the varying heights of different passengers, the apparatus may be mounted on the underside of a plate or the like fixed to the inside of the car roof, which plate, for example, may be constructed so as to be vertically adjustable by means of screw bolts and nuts.

The invention will now be described further, by way of example, with reference to the accompanying drawing, in which.

Figure 1:
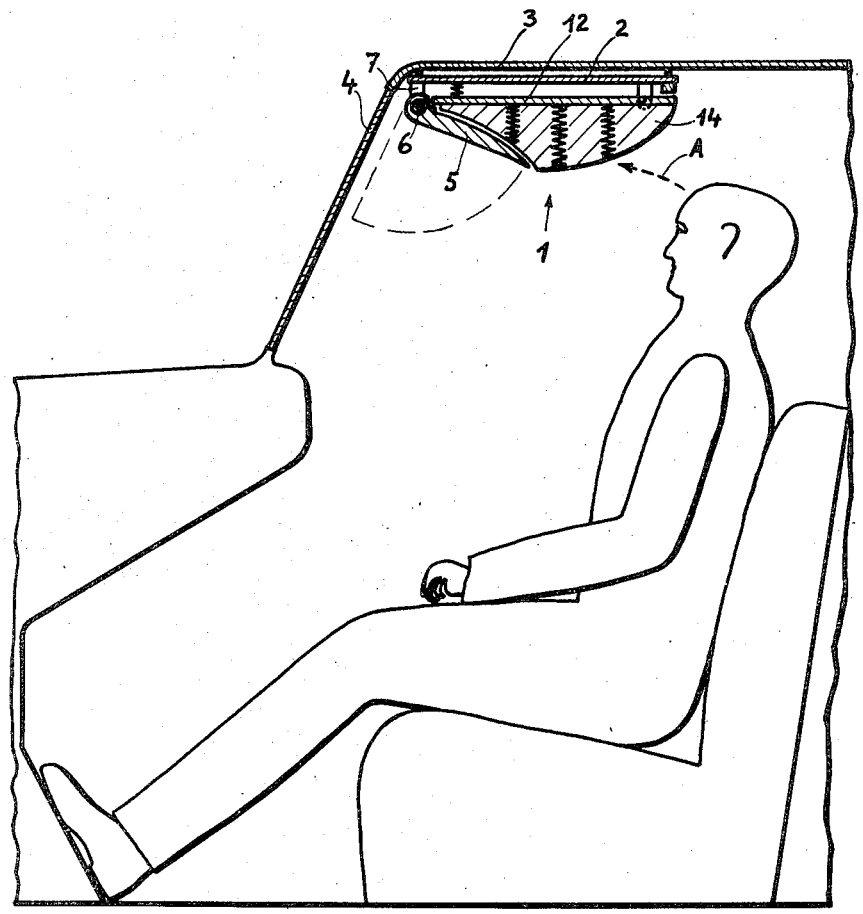
FIG. 1 is a side view of a head guard constructed in accordance with the invention and installed in a vehicle.
Figure 2:
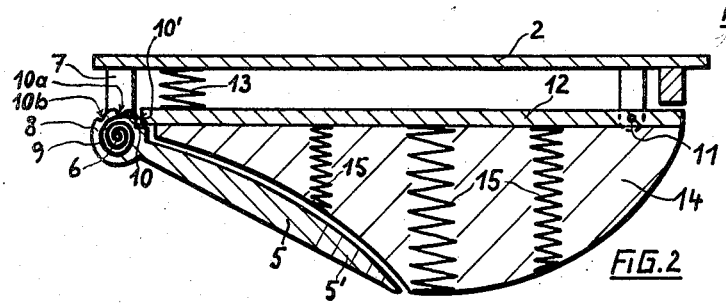
FIG. 2 is an enlarged longitudinal section through the head guard shown in FIG. 1.

A head guard device 1 is arranged on a plate or a frame 2 and secured to the underside of a car roof 3 above a windshield 4. The head guard 1 extends vertically to the plane of the drawing substantially beyond the width of one or, if necessary, both seats. A flap cushioning member 5 is mounted so as to be pivotable about a shaft 6 which in turn is mounted in two straps 7 fixed to the plate 2. A torsion spring 9 is provided in a boss 8 of the flap 5, which spring tends to swing the flap downwardly and forwardly against the windshield. The flap 5 is retained in its normal inactive position by a base plate 12, adapted to be pivoted about a second shaft 11, which engages in a notch 10 formed in the boss 8 of the flap 5. A spring 13 biases the plate 12 downwardly so that its end face is seated against a surface 10′ of the notch 10. The underside of the plate 12 is provided with a cellular plastics padding 14 reinforced by coil springs 15.

Sudden braking owing to an obstacle approaching the vehicle at high speed causes the head of a person sitting diagonally below the apparatus to be thrown substantially in the direction of the arrow A (FIG. 1) against the arresting device 12, 14. The plate 12, pivoting about shaft 11, is pressed upwards, releasing the flap 5 which, under the force of the torsion spring 9 swings towards the windshield into its operative position. The head slipping off the arcuately shaped padding 14 thus strikes against the flap 5 and is cushioned thereby.

Figure 3:
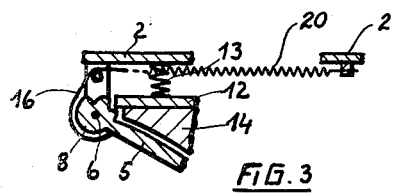
FIG. 3 is a detail of an alternative arrangement of springs for actuating the flap.

The necessary spring force for swinging down the flap may also be supplied by a tension spring 20, if the latter, as indicated in FIG. 3 for example, is transmitted in a suitable manner to the flap 5, such as a tension cable 16.

If the flap 5 is to be used as a sun visor, it can also be released and swung downwardly by manual pressure against the padding 14. In this case it is advisable to produce the flap from a suitable transparent plastics material, which is covered in the upper region or otherwise made opaque, whereas the lower region 5′ remains transparent. To permit retaining of the flap in different positions, further notches 10a and 10b are formed on the circumference of the boss 8, in which notches the plate 12 engages upon being slowly returned to its inactive position.

Figure 4:
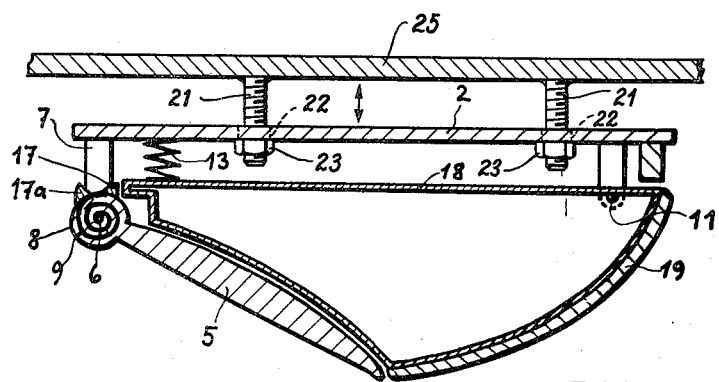
FIG. 4 is a longitudinal section through a further embodiment of the apparatus.

In FIG. 4 the plate 12 with the padding 14 is replaced by a hollow, suitably shaped plastics material body 18 which is provided on its lower arcuate side with padding 19. This body 18, which extends over the whole width of the seat and advantageously is closed at both of its ends, may be filled with cellular plastics material or a like compound for reinforcing purposes. Stops 17 and 17a serve to retain the flap 5.

To compensate for the different height of various passengers, the device may be vertically adjusted. Guide pins 21 are secured to the automobile ceiling 25 and are externally threaded. Plate 2 is provided with bores 22 (shown in dotted outline) juxtaposed with the ends of pins 21. The pins 21 fit into, and through, the bores to guide the plate 2 firmly. At their lower ends the pins are engaged by suitably shaped nuts 23 which may be hand-operated. Turning of the nuts in a tightening sense will cause the entire device to be raised toward the ceiling; loosening of the nuts permits it to move lower (i.e. to protect a shorter person).

I claim:

1. A head guard for a passenger in an automotive vehicle having a forward direction of travel, comprising support means disposed forwardly of said passenger, cushioning means swingably secured to said support means and displaceable between an inoperative and an operative position, and actuating means including a resilient body rearwardly of said cushioning means and in the path of the head of said passenger for displacing said cushioning means from its inoperative to its operative position upon being struck by the head of said passenger while propelled forwardly by the force of a collision, to intercept the head of said passenger beyond said actuating means.

2. A head guard for a passenger in an automotive vehicle having a forward direction of travel, comprising a generally horizontal frame disposed forwardly of said passenger, at least one cushioning member having a front edge and a rear edge and journaled to said frame at said front edge, said member being swingable downwardly in an arcuate path from an off-vertical operative position to a generally vertical operative position, biasing means urging said member into said operative position, and actuating means including a body rearwardly of said member and in the path of the head of said passenger cooperating with said member for releasing the same upon being struck by the head of said passenger while propelled forwardly by the force of a collision.

3. A head guard as defined in claim 2 wherein said actuating means comprises a base plate parallel to said frame, said body being integral therewith, said base plate having a forward and a rearward edge and being journaled to said frame at said rearward edge, said body being provided with a padded portion rearwardly of said member for absorbing the initial impact of the head of said passenger.

4. A head guard as defined in claim 3 wherein said padded portion of said body is downwardly convex for guiding said head forwardly against said cushioning member in the operative position thereof.

5. A head guard as defined in claim 4 wherein said cushioning member is provided with at least one stop, said guard further comprising compression-spring means secured to said frame and bearing upon said base plate for biasing the latter downwardly therefrom, said forward edge of said base plate engaging said stop for normally preventing swinging of said member into said operative position.

6. A head guard as defined in claim 5 wherein said cushioning member is padded on the side thereof facing said passenger upon said member being displaced into its operative position.

7. A head guard as defined in claim 6 wherein said cushioning member is of a height greater than that of a standard automobile sun visor, the lower portion of said member being transparent for enabling an unobstructed view forwards.

8. A head guard as defined in claim 7 wherein said horizontal base plate is vertically adjustable.

References Cited by the Examiner
UNITED STATES PATENTS

| 2,853,339 | 9/58 | Lazarus | 296—84 |
| 2,854,281 | 9/58 | Bassin | 296—84 |
| 2,855,216 | 10/58 | Sacks | 296—84 |

FOREIGN PATENTS

| 1,031,160 | 3/53 | France. |
| 903,540 | 2/54 | Germany. |

A. HARRY LEVY, *Primary Examiner.*

LEO FRIAGLIA, *Examiner.*